United States Patent
Deguchi et al.

(10) Patent No.: US 10,928,303 B2
(45) Date of Patent: Feb. 23, 2021

(54) CONCENTRATION MEASURING DEVICE

(71) Applicants: TOKUSHIMA UNIVERSITY, Tokushima (JP); FUJIKIN INCORPORATED, Osaka (JP)

(72) Inventors: Yoshihiro Deguchi, Tokushima (JP); Takashi Fukawa, Yokohama (JP); Taiki Hattori, Yokohama (JP); Masaaki Nagase, Osaka (JP); Kazuteru Tanaka, Osaka (JP); Kouji Nishino, Osaka (JP); Nobukazu Ikeda, Osaka (JP)

(73) Assignees: TOKUSHIMA UNIVERSITY, Tokushima (JP); FUJIKIN INCORPORATED, Osaka (JP)

(*) Notice: Subject to any disclaimer, the term of this patent is extended or adjusted under 35 U.S.C. 154(b) by 0 days.

(21) Appl. No.: 16/320,002

(22) PCT Filed: Jul. 25, 2017

(86) PCT No.: PCT/JP2017/026868
§ 371 (c)(1),
(2) Date: Jan. 23, 2019

(87) PCT Pub. No.: WO2018/021311
PCT Pub. Date: Feb. 1, 2018

(65) Prior Publication Data
US 2019/0271636 A1    Sep. 5, 2019

(30) Foreign Application Priority Data

Jul. 29, 2016 (JP) .............................. JP2016-149189

(51) Int. Cl.
*G01N 21/59* (2006.01)
*G01N 21/05* (2006.01)
(Continued)

(52) U.S. Cl.
CPC ......... *G01N 21/05* (2013.01); *G01N 21/0303* (2013.01); *G01N 21/33* (2013.01); *G01N 21/59* (2013.01)

(58) Field of Classification Search
CPC ........... G01N 21/3504; G01N 21/3554; G01N 21/3577; G01N 21/534; G01N 21/59; G01N 21/05; G01N 21/0303; G01F 23/292
(Continued)

(56) References Cited

U.S. PATENT DOCUMENTS 3,740,155 A * 6/1973 Keller ................ G01N 21/8507
356/409
4,914,297 A * 4/1990 Wieboldt ................ G01N 5/04
250/343
(Continued)

FOREIGN PATENT DOCUMENTS

CN      1904593 A      1/2007
JP      S52-098478 U   7/1977
(Continued)

OTHER PUBLICATIONS

International Search Report issued in PCT/JP2017/026868; dated Sep. 12, 2017.

*Primary Examiner* — Hoa Q Pham
(74) *Attorney, Agent, or Firm* — Studebaker & Brackett PC

(57) ABSTRACT

A concentration measuring device includes a measuring cell having a flow passage and a translucent window, a light source for emitting light to the measuring cell through the window, a reflective member for reflecting light propagating through the measuring cell to the window, a light detector for detecting the light exiting from the window, a calculation part for calculating the concentration of the fluid on the basis of a detection signal from the light detector, and an optical (Continued)

device for guiding the light from the light source to the window and guiding the light from the window to the light detector.

17 Claims, 8 Drawing Sheets

(51) Int. Cl.
*G01N 21/03* (2006.01)
*G01N 21/33* (2006.01)

(58) Field of Classification Search
USPC .......................... 356/432–440, 246; 250/343
See application file for complete search history.

(56) References Cited

U.S. PATENT DOCUMENTS

| | | | |
|---|---|---|---|
| 5,376,551 A * | 12/1994 | Yoshikami | G01N 33/582 422/54 |
| 5,438,420 A | 8/1995 | Harwick et al. | |
| 5,525,518 A | 6/1996 | Lundsgaard et al. | |
| 5,693,944 A | 12/1997 | Rich | |
| 5,963,336 A * | 10/1999 | McAndrew | C23C 16/4412 216/60 |
| 6,043,156 A | 3/2000 | Kai et al. | |
| 7,411,668 B2 * | 8/2008 | Klinkhammer | G01N 21/05 356/213 |
| 8,547,554 B2 * | 10/2013 | Liu | G01N 21/3554 356/437 |
| 9,194,797 B2 * | 11/2015 | Liu | G01N 33/0062 |
| 2006/0181710 A1 * | 8/2006 | Kachanov | G01N 21/39 356/437 |
| 2008/0092648 A1 * | 4/2008 | Zhou | G01N 21/3504 73/335.01 |
| 2009/0046287 A1 * | 2/2009 | Haught | G01J 3/02 356/319 |
| 2010/0302546 A1 * | 12/2010 | Azimi | G01J 3/02 356/437 |
| 2011/0299084 A1 * | 12/2011 | Feitisch | G01N 21/031 356/433 |
| 2012/0006098 A1 | 1/2012 | Degner et al. | |
| 2014/0226149 A1 * | 8/2014 | Coates | G01F 23/292 356/51 |
| 2015/0160125 A1 * | 6/2015 | Jackson | G01N 21/645 250/227.23 |
| 2016/0084700 A1 | 3/2016 | Nagase et al. | |
| 2016/0327479 A1 * | 11/2016 | Feitisch | G01J 3/0208 |
| 2018/0217054 A1 | 8/2018 | Deguchi et al. | |

FOREIGN PATENT DOCUMENTS

| | | |
|---|---|---|
| JP | S62-145141 U | 9/1987 |
| JP | S63-051260 U | 4/1988 |
| JP | H01-295136 A | 11/1989 |
| JP | H04-502511 A | 5/1992 |
| JP | H07-043291 A | 2/1995 |
| JP | H08-035930 A | 2/1996 |
| JP | H10-135165 A | 5/1998 |
| JP | 2004-138520 A | 5/2004 |
| JP | 2014-038069 A | 2/2014 |
| JP | 2014-219294 A | 11/2014 |
| WO | 2017/029792 A1 | 2/2017 |

* cited by examiner

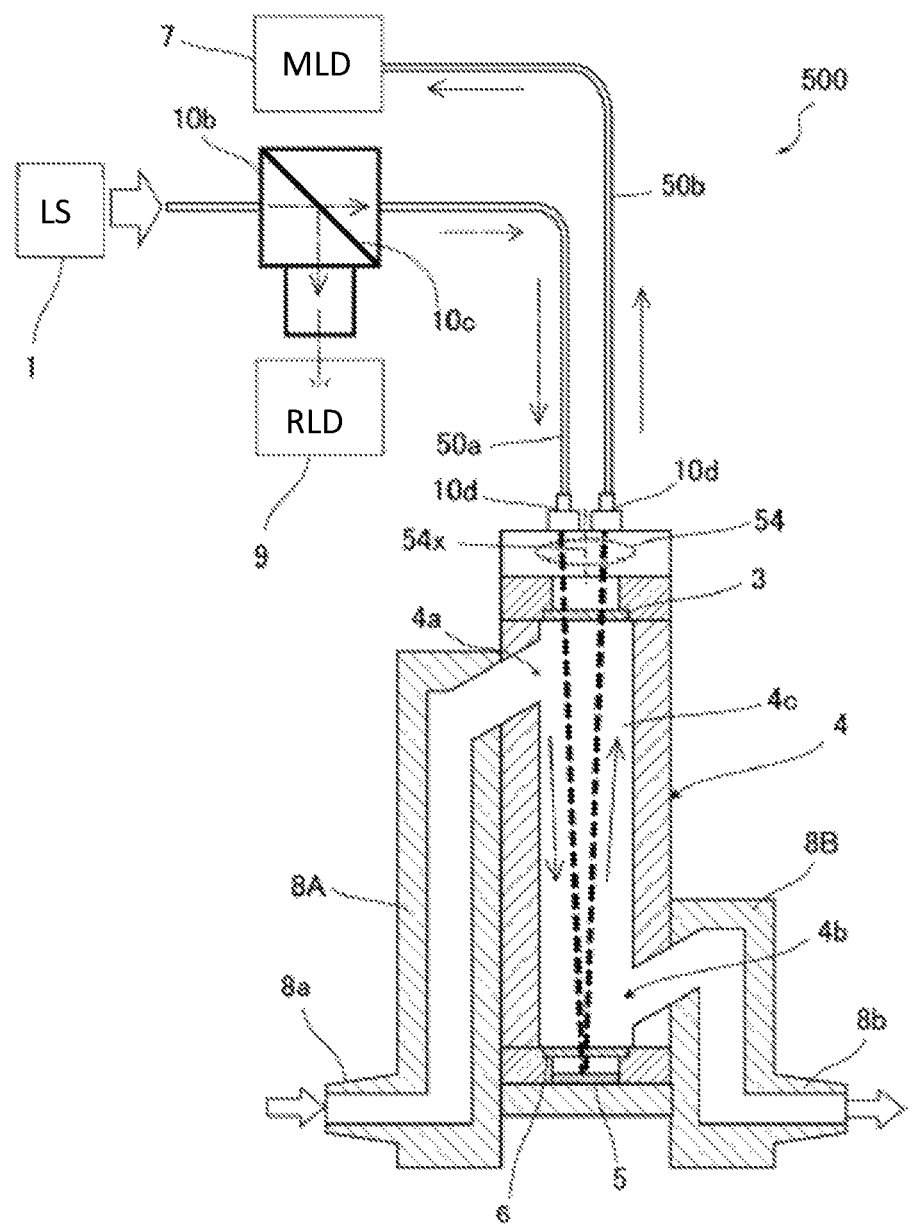

CONCENTRATION MEASURING DEVICE

TECHNICAL FIELD

The present invention relates to a concentration measuring device, and in particular to a concentration measuring device that measures the concentration of a fluid to be measured, by causing light to enter a measuring cell in which the fluid to be measured has been introduced, and detecting light that has passed through the fluid to be measured and has exited from the measuring cell.

BACKGROUND ART

Concentration measuring devices (so-called in-line concentration measuring devices) that are incorporated in a gas supply line for supplying source gases such as those formed of liquid or solid materials including organic metal (MO) to semiconductor manufacturing equipment and that are configured to measure the concentration of gas flowing through the gas supply line are conventionally known.

Concentration measuring devices of this type measure absorbance by causing light of a predetermined wavelength to enter a measuring cell to which a fluid to be measured is supplied, from a light source through a light entrance window, and receiving transmitted light that has passed through the measuring cell with a light receiving element. The concentration measuring devices can also obtain the concentration of the fluid from the measured absorbance in accordance with Lambert-Beer's law (e.g., Patent Documents (PTLs) 1 and 2).

In the specification of the present application, various transmitted light detection structures that are used to detect the concentration of an internally introduced fluid to be measured are widely referred to as "measuring cells." The measuring cells are assumed to include not only a cell structure that branches off from a gas supply line and is disposed independently, but also a transmitted light detection structure provided in a gas supply line such as disclosed in PTL 1.

CITATION LIST

Patent Literatures

PTL 1: Japanese Patent Application Laid-Open No. 2014-219294
PTL 2: International Patent Publication No. WO 2017/029792
PTL 3: Japanese Patent Application Laid-Open No. 2014-38069

SUMMARY OF INVENTION

Technical Problem

In International Patent Publication No. WO 2017/029792 (PTL 2), the applicant of the present application discloses a concentration measuring device in which a light entrance window and a light exit window are disposed one at either end of a measuring cell, opposing each other. In this configuration, the outer side of the light entrance window is fixed to one end of an optical fiber that is connected to a light source, thereby allowing light for use in detection to enter the measuring cell through the light entrance window. On the other hand, the outer side of the light exit window is fixed to one end of an optical fiber that is connected to a light detector, thereby guiding light exiting from the light exit window to the light detector.

However, the configuration in which the optical fiber for light entrance and the optical fiber for light detection are mounted separately one at either end of the measuring cell tends to increase the overall size of the concentration measuring device. This is because the optical fibers are preferably connected to each device in such a manner as to be bent at a radius of curvature of a certain degree or more in order to prevent breakage or a reduction in transmission efficiency, and a relatively large space needs to be allocated on both sides of the measuring cell in order to install the optical fibers.

The present invention has been achieved in light of the aforementioned problems, and it is a primary object of the present invention to provide a concentration measuring device suitable for downsizing.

Solution to Problem

A concentration measuring device according to an embodiment of the present invention includes a measuring cell that includes a flow passage of a fluid to be measured and a translucent window adjoining the flow passage, a light source that emits light that enters the measuring cell through the window, a reflective member that reflects the light that propagates through the measuring cell, and causes the reflected light to exit from the measuring cell through the window, a light detector that detects light exiting from the window of the measuring cell, a calculation part that calculates a concentration of the fluid to be measured on the basis of a detection signal of the light detector, and an optical device that guides the light emitted from the light source to the window of the measuring cell, and guides the light exiting from the window of the measuring cell to the light detector.

In one embodiment, the reflective member is disposed opposing the window across the flow passage.

In one embodiment, the optical device includes a light guide member and a beam splitter that is connected to the light guide member, and the beam splitter receives the light from the light source and causes the received light to enter the measuring cell via the light guide member, and receives the light exiting from the measuring cell and guided by the light guide member and causes the received light to enter the light detector.

In one embodiment, the optical device includes an optical fiber bundle that includes an optical fiber for light exit that guides the light emitted from the light source to the window of the measuring cell, and an optical fiber for light reception that guides the light exiting from the window of the measuring cell to the light detector.

In one embodiment, an inlet and an outlet that communicate with the flow passage are provided one at either end of the measuring cell.

In one embodiment, one of the inlet and the outlet is disposed in proximity to the window, and the other of the inlet and the outlet is disposed in proximity to the reflective member.

In one embodiment, the light is ultraviolet light, and the reflective member includes a reflective layer formed of a material containing aluminum or a reflective layer formed of a dielectric multilayer film.

In one embodiment, the reflective member includes a translucent plate and a reflective layer provided on one surface of the translucent plate, and has a front-back distinguishable structure for distinguishing a surface on which the reflective layer is provided from the other surface of the translucent plate.

In one embodiment, the front-back distinguishable structure is configured by asymmetrically disposing any of a flat face provided on a side face of the translucent plate, a recess or a through hole provided in the translucent plate, and a protrusion provided on the translucent plate.

A concentration measuring device according to an embodiment of the present invention includes a measuring cell that includes a flow passage of a fluid to be measured and a translucent window adjoining the flow passage, a light source that emits light that enters the measuring cell through the window, a reflective member that reflects the light that propagates through the measuring cell, and causes the reflected light to exit from the measuring cell through the window, a light detector that detects the light exiting from the window of the measuring cell, a calculation part that calculates a concentration of the fluid to be measured on the basis of a detection signal of the light detector, and a first optical device that guides the light emitted from the light source to the window of the measuring cell, and a second optical device that guides the light exiting from the window of the measuring cell to the light detector. The reflective member is configured to receive incident light that has been incident from the first optical device and has propagated through the flow passage of the measuring cell, and reflect the light to the second optical device along an optical path different from the optical path of the incident light. An inlet and an outlet that communicate with the flow passage are provided one at either end of the measuring cell, one of the inlet and the outlet being disposed in proximity to the window, and the other of the inlet and the outlet being disposed in proximity to the reflective member.

In one embodiment, the light from the light source is caused to branch off and enter a reference light detector as reference light.

In one embodiment, the optical path of the reflected light is parallel to the optical path of the incident light.

In one embodiment, the reflective member includes a trigonal prism.

In one embodiment, the reflective member includes a reflecting surface that is inclined to a plane perpendicular to a travel direction of the incident light.

In one embodiment, the concentration measuring device further includes an optical element that is provided in proximity to the window, receives the light exiting from the first optical device and causes the light to enter the measuring cell, and receives the reflected light from the measuring cell and causes the light to enter the second optical device. An optical axis of the optical element is disposed between the first optical device and the second optical device.

Advantageous Effects of Invention

According to embodiments of the present invention, a concentration measuring device that allows ease of maintenance and enables downsizing is provided.

BRIEF DESCRIPTION OF DRAWINGS

FIG. 8 is a cross-sectional view schematically illustrating the essential part of a concentration measuring device according to Embodiment 5 of the present invention.

DESCRIPTION OF EMBODIMENTS

Embodiments of the present invention will be described hereinafter with reference to the drawings, but the present invention is not limited to the embodiments described below.

Embodiment 1

Figure 1:
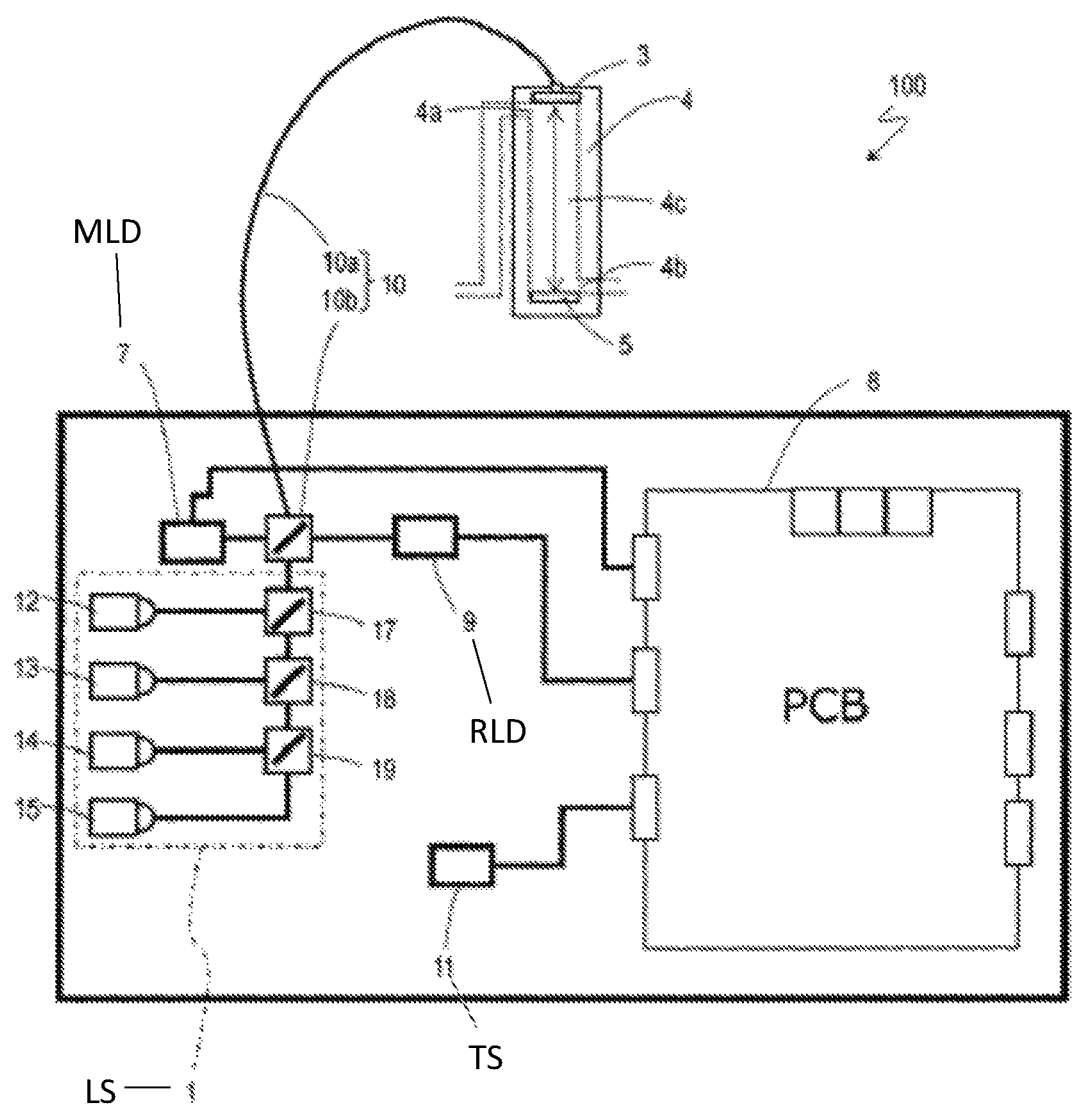
FIG. 1 is a schematic diagram illustrating an overall configuration of a concentration measuring device according to Embodiment 1 of the present invention.

FIG. 1 is a schematic diagram illustrating an overall configuration of a concentration measuring device 100 according to Embodiment 1 of the present invention. The concentration measuring device 100 includes a measuring cell 4 that includes an inlet 4*a*, an outlet 4*b*, and a flow passage 4*c* of a fluid to be measured and in which a translucent window 3 is provided adjoining the flow passage 4*c*, a light source 1 that produces light that enters the measuring cell 4 through the translucent window 3, a reflective member 5 that is configured to reflect light that propagates through the measuring cell 4 and to cause the reflected light to exit from the measuring cell 4 through the window 3, a measurement light detector 7 that detects light reflected by the reflective member 5 and exiting from the measuring cell 4, a calculation part 8 that calculates the concentration of the fluid to be measured on the basis of a detection signal of the measurement light detector (MLD) 7, a reference light detector (RLD) 9 that detects reference light received from the light source 1 (LS), and a temperature sensor (TS) 11. Note that another window (not shown) may also be provided in front of the reflective member 5.

In the specification of the present application, "light" includes not only visible light but also at least infrared rays and ultraviolet rays, and can also include electromagnetic waves of an arbitrary wavelength. Also, the word "translucent" means that internal transmittance with respect to light that is incident on the measuring cell is high enough that concentration can be measured.

Light receiving elements that configure the measurement light detector 7 and the reference light detector 9 are, for example, photodiodes, hut are not limited thereto, and may be phototransistors or other such devices. The calculation part 8 may be configured by, for example, processors and memories provided on a circuit board PCB, includes computer programs for executing predetermined calculations on the basis of input signals, and can be implemented by a combination of hardware and software.

The light source 1 includes a plurality of light emitting elements 12 to 15, and in the present example, the light emitting elements 12 to 15 are LEDs that emit light of different wavelengths. A driving current of a different frequency is sent to each of the light emitting elements 12 to 15, using an oscillation circuit. In this case, through frequency analysis (e.g., fast Fourier transformation or wavelet transformation), the intensity of light that corresponds to each wavelength component can be measured from the detection signal detected by the measurement light detector 7. Light waves of a plurality of wavelengths emitted from the light emitting elements 12 to 15 are combined by optical multiplexers 17, 18 and 19 with wavelength division multiplexing (WDM) technology, and the combined light wave is incident on the measuring cell 4. Here, one example is given in which the optical wavelength of the light emitting element 12 is 255 nm, the optical wavelength of the light emitting element 13 is 280 nm, the optical wavelength of the light emitting element 14 is 310 nm, and the optical wavelength of the light emitting element 15 is 365 nm; and the frequency of the driving current of the light emitting element 12 is 216 Hz, the frequency of the driving current of the light emitting element 13 is 192 Hz, the frequency of the driving current of the light emitting element 14 is 168 Hz, and the frequency of the driving current of the light emitting element 15 is 144 Hz. In this way, in the present embodiment, the light source 1 is configured to output ultraviolet light that contains a plurality of wavelength components. The light emitting elements 12 to 15 may be light emitting elements other than LEDs, such as laser diodes (LDs).

A concentration measuring device that uses combined ultraviolet light of a plurality of wavelengths as measurement light is disclosed in, for example, PTL 2 (International Patent Publication No. WO 2017/029792), and the present invention can also use similar constituent elements such as a light source and a calculation part. The entire disclosures of International Patent Publication No. WO 2017/029792 are hereby incorporated by reference. Note that a light source of a single wavelength can also be used, instead of using combined light of a plurality of different wavelengths as a light source. In this case, the optical multiplexers and the frequency analysis circuit can be omitted. While a mode in which the combined light is formed by the four light emitting elements is shown above, it goes without saying that the combined light may be formed by any one, two, or three of those light emitting elements, or may be formed by five or more light emitting elements.

In the concentration measuring device 100 of the present embodiment, an optical device 10 that includes an optical fiber 10a serving as a light guide member and a beam splitter 10b is provided between the light source 1 and the measuring cell 4. The light emitted from the light source 1 is guided by the optical device 10 to the window 3 of the measuring cell 4. The optical device 10 also has the function of guiding the light reflected by the reflective member 5 to the measurement light detector 7. The beam splitter 10b can also separate part of the light emitted from the light source 1 and cause the separated light to enter the reference light detector 9 as reference light. The reference light detected by the reference light detector 9 is used to correct measurement light.

While the present embodiment describes an example in which optical fibers are used as light guide members, the present invention is not limited to this example, and the light guide members may, for example, be members that are configured to be able to guide light through a predetermined space by using reflection caused by a mirror, or translucent members made of a resin or glass.

Figure 2:
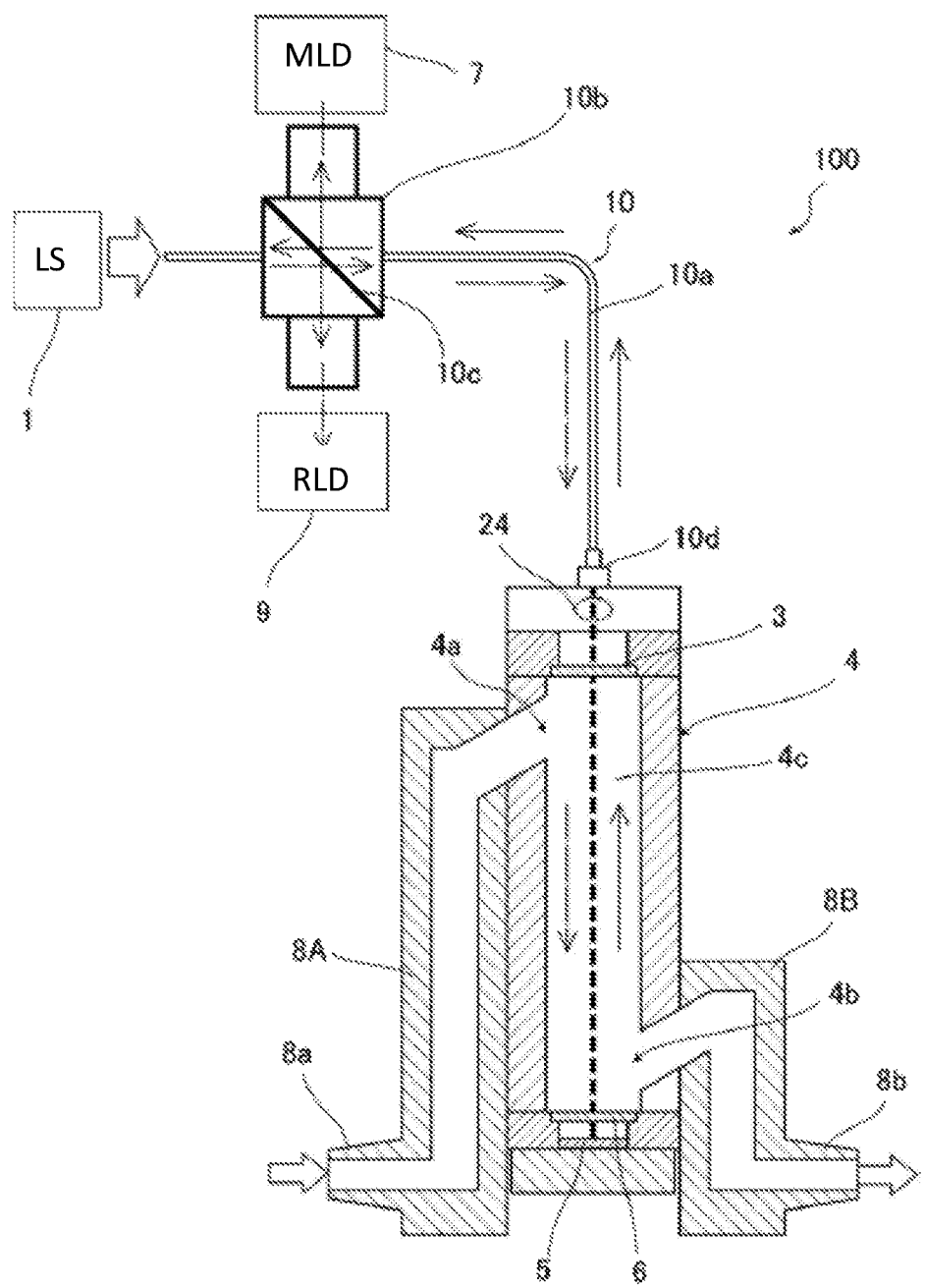
FIG. 2 is a cross-sectional view schematically illustrating the essential part of the concentration measuring device according to Embodiment 1 of the present invention.

FIG. 2 is a cross-sectional view schematically illustrating the essential part of the concentration measuring device 100. As illustrated in FIG. 2, one end of the optical fiber 10a is attached by a connecting part 10d to the measuring cell 4, and the other end is connected to the beam splitter 10b. The connecting part 10d to the measuring cell 4 may include an optical element 24 such as a collimating lens, thereby allowing light to exit appropriately to the inside of the measuring cell 4 and allows light to be received appropriately from the measuring cell 4.

The beam splitter 10b transmits part of the light emitted from the light source 1 and emits the transmitted light to the optical fiber 10a, and also reflects part of the light reflected by the reflective member 5 and returned from the measuring cell 4 through the optical fiber 10a and emits the reflected light to the measurement light detector 7, in order to transmit and reflect light, the beam splitter 10b may include, for example, a 50% reflection filter 10c.

Next, the configuration of the measuring cell 4 will be described. The measuring cell 4 has the flow passage 4c that passes gas from the inlet 4a to the outlet 4b, and the inlet 4a and the outlet 4b are provided one at either end of the measuring cell 4, apart from each other. In the present embodiment, the inlet 4a is disposed in proximity to the window 3, and the outlet 4b is disposed in proximity to the reflective member 5. The measuring cell 4 has a vertical configuration, with the flow passage 4c extending in the vertical direction. The concentration measuring device 100 can measure the concentration of gas to be measured while the gas is flowing along the vertical flow passage 4c.

To describe more specifically, the measuring cell 4 of the present embodiment includes a first flow passage forming member 8A (e.g., piping and a flow passage block) provided on the outer side of the inlet 4a and a second flow passage forming member 8B provided on the outer side of the outlet 4b. The first flow passage forming member 8A and the second flow passage forming member 8B are respectively provided with line connecting parts 8a and 8b that establish connection to the gas supply line. The concentration measuring device 100 is configured to pass gas in the horizontal direction (direction in which the line connecting parts 8a and 8b are aligned) as a whole when incorporated in the gas supply line. In contrast, the flow passage 4c of the measuring cell 4 extends in the direction orthogonal to the overall flow direction in the gas supply line, and this configuration is referred to as the vertical measuring cell 4 or the flow passage 4c extending in the vertical direction. The configuration is, however, not limited to this example, and it is sufficient that the flow passage 4c extends in a direction that forms an angle of, for example, 45 degrees or more, and preferably in a direction that forms an angle of 60 degrees or more, with the overall flow direction. Using such a vertical measuring cell 4 enables measures to be taken against dead space and space savings to be realized when the concentration measuring device is incorporated in the gas supply line, and also brings about the advantage of allowing ease of maintenance.

In the present embodiment, the positions of the window 3 and the reflective member 5 may be reversed, and in this case, the positions of the inlet 4a and the outlet 4b are also reversed. Moreover, while the inlet 4a is provided in proximity to the window 3 and the outlet 4b is provided in proximity to the reflective member 5 in the present embodiment, the inlet 4a may be provided in proximity to the reflective member 5 and the outlet 4b may be provided in proximity to the window 3.

The measuring cell 4 is provided with the window (translucent plate) 3 for light entrance and for light exit. The window 3 is preferably mechanically and chemically stable sapphire glass that has resistance and high transmittance with respect to detection light such as ultraviolet light for use in concentration measurement, but other stable materials such as silica glass can also be used. The body (flow passage forming portions) of the measuring cell 4 may be made of, for example, SUS316L.

In the measuring cell 4, the window 3 and the reflective member 5 are disposed opposing each other across the flow passage 4c. The reflective member 5 of the present embodiment is provided so as to have a reflecting surface perpendicular to the travel direction of incident light. Thus, the reflected light is reflected toward the window 3 along substantially the same optical path as the optical path of the incident light. In the illustrated mode, a reflection-side window 6 is disposed apart from and in front of the reflective member 5, and sapphire glass is preferably used as the reflection-side window 6. The present invention is, however, not limited to this mode, and the reflective member 5 may be configured to include the reflection-side window 6 and may have, for example, a configuration in which an aluminum layer serving as a reflective layer is formed by sputtering on the rear surface of sapphire glass. The reflective member 5 may be configured in a mode in which a reflecting mirror is disposed on the rear surface of sapphire glass.

The reflective member 5 may also include a dielectric multilayer film as a reflective layer, and the use of the dielectric multilayer film allows light of a specific wavelength range (e.g., near-ultraviolet rays) to be reflected selectively. The dielectric multilayer film is configured by a laminated body of a plurality of optical films with different refractive indices (e.g., a laminated body of a thin film with a high refractive index and a thin film with a low refractive index), and light of a specific wavelength can be reflected and transmitted by appropriately selecting the thickness and refractive index of each layer.

The dielectric multilayer film can also reflect light at an arbitrary ratio, and thus, for example, when the incident light is reflected by the reflective member 5, can transmit part (e.g., 10%) of the incident light, instead of reflecting 100% of the incident light, so that transmitted light can also be received by an optical device (not shown) that is provided below the reflective member 5 (at a position opposing the reflection-side window 6 when viewed from the reflective member 5). Then, this transmitted light may be used as the reference light, in which case the optical device can be used as a substitute for the reference light detector 9. Alternatively, the transmitted light may be used to calculate the concentration of gas, because the transmitted light is light that has passed through the gas flowing through the measuring cell 4 and been absorbed by the gas. At this time, the reflected light may be used to monitor changes over time in the reflective member 5 and the reflection-side window 6.

The reflective member 5 may be configured by a retroreflector plate (e.g., a corner cube array). Using the retroreflector plate enables retroreflection of light to the vicinity of the position of light incidence even if the reflecting surface is not disposed perpendicular to the direction of light incidence. Thus, the arrangement of the light incident portion and the reflective member 5 can be designed more freely.

In the illustrated mode, the window 3 is disposed in a plane perpendicular to the travel direction of the incident light, but in other embodiments, the window 3 may be disposed at a slight angle with respect to the perpendicular plane. This prevents the light reflected by the window 3 from entering the optical device 10 as detection light, thus improving measurement accuracy.

In the measuring cell 4 described above, the optical path length of the light propagating through the measuring cell 4 can be defined as two times the distance between the surfaces of the window 3 and the reflective member 5. Also, in the case where the reflection-side window 6 that seals the end of the flow passage is provided apart from and in front of the reflective member 5 as illustrated in FIG. 2, the optical path length of the light passing through the gas (also referred to as the optical path length of the measuring cell) can be defined as two times the distance between the window 3 and the reflection-side window 6.

In the above-described concentration measuring device 100, light of absorption wavelength components, out of the light that is incident on the measuring cell 4 and then reflected by the reflective member 5, is absorbed by the gas that is present in the flow passage 4c of the measuring cell 4. The magnitude of absorption depends on the concentration of the gas. Then, the calculation part 8 (see FIG. 1) can measure absorbance $A\lambda$ at that absorption wavelength through frequency analysis of the detection signal received from the measurement light detector 7 and can further calculate gas concentration C from the absorbance $A\lambda$ in accordance with Lambert-Beer's law expressed by Equation (1) below.

$$A\lambda = -\log_{10}(I/I_0) = \alpha LC \tag{1}$$

In Equation (1) above, $I_0$ is the intensity of incident light on the measuring cell, I is the intensity of light passing through the gas in the measuring cell, $\alpha$ is the molar absorption coefficient (m$^2$/mol), L is the optical path length (m) of the measuring cell, and C is the concentration (mol/m$^3$). The molar absorption coefficient $\alpha$ is a coefficient determined by the material.

Note that, with regard to the incident light intensity $I_0$ in the above equation, the intensity of light that is detected by the measurement light detector 7 when no absorbent gas is present in the measuring cell 4 (e.g., when the measuring cell is filled with a purge gas that does not absorb ultraviolet light or when the measuring cell is under vacuum) may be taken as the incident light intensity $I_0$.

Here, since the optical path length L of the measuring cell 4 can be defined as two times the distance between the window 3 and the reflection-side window 6 as described above, the optical path length that can be obtained is two times the optical path length of the conventional concentration measuring device in which the light entrance window and the light exit window are disposed one on either side of the measuring cell. This configuration may improve measurement a c racy while achieving downsizing. The concentration measuring device 100 can also reduce the number of parts because the incidence and reception of light are implemented by only the one optical device 10 through the one window 3 provided on one side of the measuring cell 4.

Figure 3:
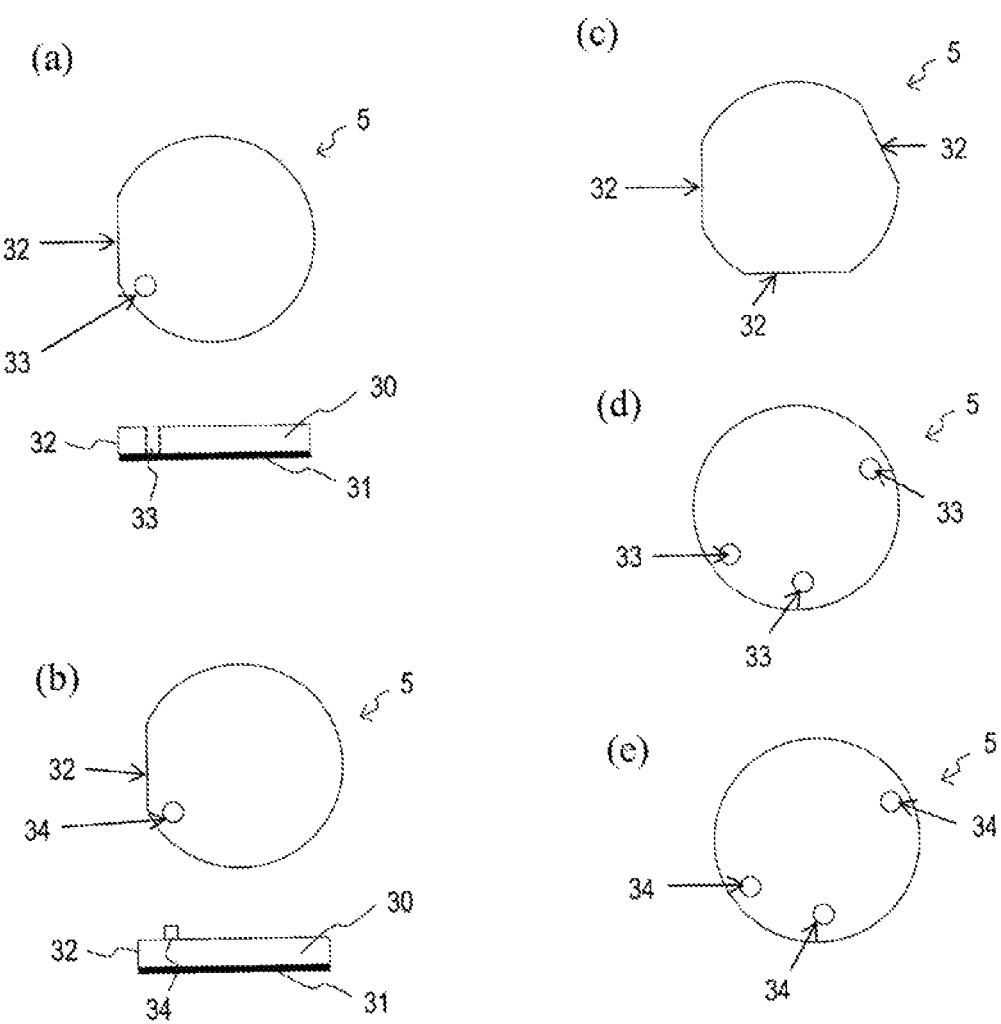
FIG. 3 illustrate a reflective member of the concentration measuring device according to Embodiment 1 of the present invention, with FIGS. 3(*a*) to 3(*e*) corresponding to different modes, the upper sections and lower sections in FIGS. 3(*a*) and 3(*b*) respectively being plan views and cross-sectional views, and FIGS. 3(*c*) to 3(*e*) being plan views.

FIGS. 3(a) to 3(e) illustrate various modes of the reflective member 5. As illustrated in FIG. 3(a), the reflective member 5 includes a translucent plate 30 made of sapphire glass and an aluminum layer 31 provided on the rear surface of the translucent plate 30 and serving as a reflective layer.

The reflective member 5 is mounted on the measuring cell 4, but can also be mounted so as to adjoin the flow passage 4c of gas in a configuration in which the reflection-side window 6 as illustrated in FIG. 2 is not provided. The aluminum layer 31 has high reflectivity (of, for example, 90% or higher) to ultraviolet light, but can possibly cause the gas flowing along the flow passage to be contaminated with aluminum, which is a significant problem when, for example, the concentration measuring device is connected to semiconductor manufacturing equipment. Thus, in order to prevent the contamination by aluminum, care needs to be taken not to make a mistake with the mounting direction of the reflective member 5, and it is required to dispose the reflective member 5 such that the surface on which the aluminum layer 31 is provided is located on the outer side so as not to adjoin the gas flow passage 4c. In order to achieve this, the reflective member 5 preferably has a structure in which the front and back are distinguishable in order to distinguish the surface on which the reflective layer (aluminum layer) is provided from the other surface.

As examples of the front-back distinguishable structure, FIG. 3(a) shows one orientation flat (flat face provided on the side face of the translucent plate 30) 32 and one through hole 33 that are provided at positions that do not oppose each other across the center of the translucent plate 30 (i.e., asymmetrically) on the surface of the translucent plate 30. In this way, in the case of using two distinctive front-back distinguishable structures that can be discriminated from each other, the two structures are disposed so as not to oppose each other, and the receiver side of the measuring cell 4 is configured to have corresponding fitting shapes. This avoids a situation where the reflective member 5 is mistakenly mounted back to front, and prevents the gas from being contaminated with aluminum.

FIG. 3(b) illustrates a mode in which one orientation flat 32 and one protrusion 34 are provided as front-back distinguishable structures. These can also serve as front-back distinguishable structures by being disposed on the translucent plate 30 so as not to oppose each other across the center of the translucent plate 30.

Moreover, in the case of using front-back distinguishable structures of the same mode as illustrated in FIG. 3(c) to FIG. 3(e), three orientation flats 32, three through holes 33, or three protrusions 34 can also serve as front-back distinguishable structures by being disposed asymmetrically, i.e., being disposed asymmetrically on the surface of the translucent plate 30 so as not to be symmetric with respect to a line that is an arbitrary axis passing through the center of the translucent plate 30. Note that it goes without saying that four or more front-back distinguishable structures may be provided.

As structures to be actually provided on the translucent plate 30, the orientation flats 32, the through holes 33, or a combination of the orientation flats and the through holes are preferably used from the viewpoint of the manufacturing process, but the front-back distinguishable structures may take various modes. For example, recesses may be used instead of the through holes 33, or notches or corners may be provided on the side face instead of the orientation flats 32. Alternatively, a tapered chamfer or a stepped notch may be formed along the periphery of one side of the translucent plate 30.

One mode of the connecting part 10d for mounting the optical device 10 on the measuring cell 4 will be described hereinafter. The connecting part 10d is a portion disposed in proximity to the window 3 of the measuring cell 4 as illustrated in FIG. 2 and is preferably designed such that concentration measurement can be performed with high accuracy without breakage even if the gas to be measured that flows through the measuring cell 4 is at a high temperature.

Figure 4:
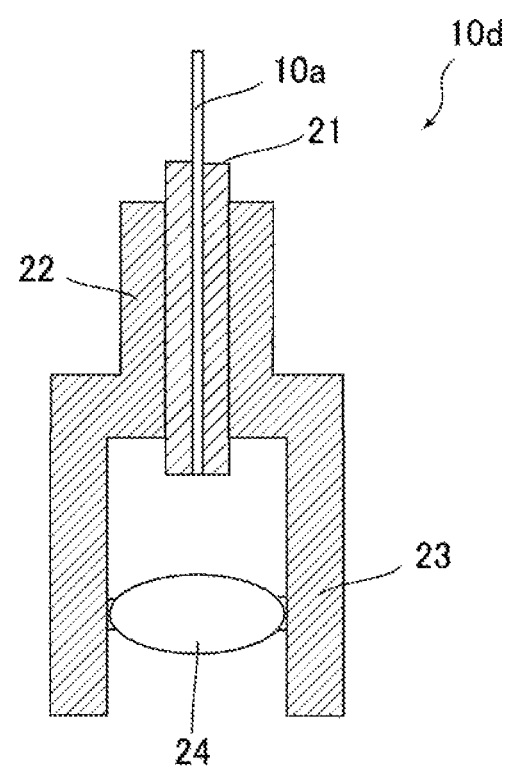
FIG. 4 is a cross-sectional view illustrating a connecting part between an optical device and a measuring cell in the concentration measuring device according to Embodiment 1 of the present invention.

As illustrated in FIG. 4, the connecting part 10d of the optical device 10 has an inner tubular portion 21 serving as a protective member that covers one end of the optical fiber 10a, a holder 22 of the inner tubular portion 21, and a tip tubular portion 23 to the inner side of which the optical element 24 is fixed.

The holder 22, the inner tubular portion 21, and the tip tubular portion 23 may be made of, for example, stainless steel (SUS316L, or SUS304). The optical fiber 10a may have a polyimide layer serving as a coating layer on the outer surface. The core and clad of the optical fiber 10a may be made of, for example, quartz. The optical element 24 is a collimating lens made of quartz, and is fixed to the inner side of the tip tubular portion 23 with, for example, an epoxy resin. In this mode, the connecting part 10d constitutes a collimator.

In this way, the connecting part 10d is configured by tubular metallic members that protect the optical fiber 10a. Thus, even if a high-temperature gas flows through the measuring cell 4 after the connecting part 10d is mounted on the concentration measuring device, the connecting part 10d will not be damaged, and high detection light output can be maintained. With the use of the above-described optical device 10, the concentration measuring device can be applied to not only materials that are gaseous at low and ambient temperatures, but also high-temperature gases up to, for example, 200° C. that are vaporized by heating, and can measure the concentration of a fluid to be measured with high accuracy in a wide range of applications.

Embodiment 2

A concentration measuring device 200 according to Embodiment 2 will be described hereinafter with reference to FIGS. 5(a) and 5(b).

The concentration measuring device 200 according to the present embodiment is different from the concentration measuring device 100 of Embodiment 1 in the configuration of the optical device. The other constituent elements such as the measuring cell 4 are the same as those of Embodiment 1, and thus the same reference numerals are given thereto, and detailed description thereof is omitted.

The optical device of the concentration measuring device 200 uses an optical fiber bundle 40 that is configured by bundling a plurality of optical fibers together, in order to connect the measuring cell 4 to the light source 1 and the measurement light detector 7. The optical fiber bundle 40 includes at least one optical fiber 40a for light exit and at least one optical fiber 40b for reflected light reception.

Figure 5:
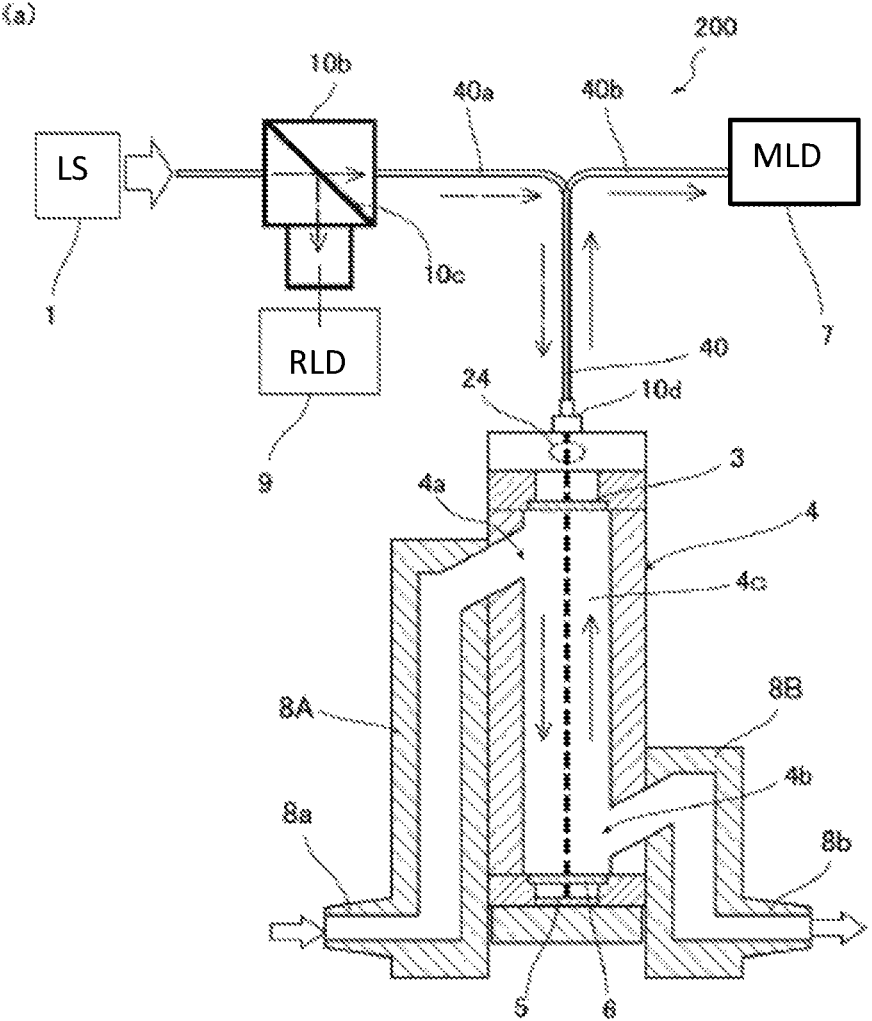
FIG. 5(*a*) is a cross-sectional view schematically illustrating the essential part of a concentration measuring device according to Embodiment 2 of the present invention, and FIG. 5(*b*) is a cross-sectional view of an optical fiber bundle.
Figure 5:
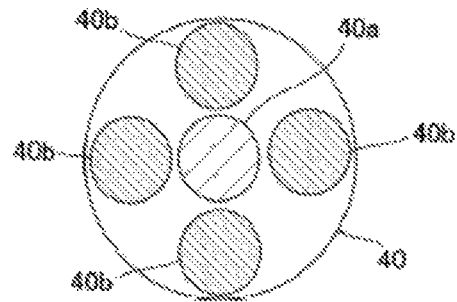

In the present embodiment, four optical fibers 40b for reflected light reception are disposed so as to surround one optical fiber 40a for light exit as illustrated in FIG. 5(b). This configuration allows light to be incident on the measuring cell 4 from the center portion and allows reflected light to be received by the optical fibers 40b around the optical fiber 40a. The configuration of the optical fiber bundle 40 is, however, not limited to the illustrated mode, and the numbers and arrangement of the optical fibers 40a for light exit and the optical fibers 40b for light reception may be arbitrarily determined.

One end of the optical fiber bundle 40 is attached to the measuring cell 4 via the connecting part 10d in the same manner as in Embodiment 1. In the present embodiment, the other end of the optical fiber bundle 40 branches partway along. Of the branched optical fibers, the end of the optical fiber 40a for light incidence is connected to the beam splitter 10b, and the ends of the optical fibers 40b for reflected light reception are connected to the measurement light detector 7.

In this configuration, the incident light and the reflected light are guided by the different optical fibers 40a and 40b, and therefore the interference of signals is reduced and concentration measurement can be performed with high accuracy. The beam splitter 10b separates the light received from the light source 1 into reference light and light that enters the measuring cell 4, but unlike in Embodiment 1, the beam splitter 10b does not receive reflected light from the measuring cell 4, and the reflected light is output directly to the measurement light detector 7. This avoids a situation where the output of the reflected light is reduced as a result of being further reflected off the beam splitter 10b in order to be guided to the measurement light detector 7, thus producing higher detection light output.

Embodiment 3

A concentration measuring device 300 according to Embodiment 3 will be described hereinafter with reference to FIG. 6. Constituent elements that are the same as those of Embodiment 1 are given the same reference numerals, and detailed description thereof is omitted.

Unlike the concentration measuring device 100 of Embodiment 1, the concentration measuring device 300 according to the present embodiment is configured using a reflective member 60 that is configured by, for example, a prism such that the incident light and the reflected light pass along different parallel optical paths in the measuring cell 4. Note that a configuration that uses light reflected by a prism for concentration measurement is disclosed in, for example, PTL 3, but the concentration measuring device disclosed in PTL 3 is not an in-line concentration measuring device as described in the present embodiment.

Figure 6:
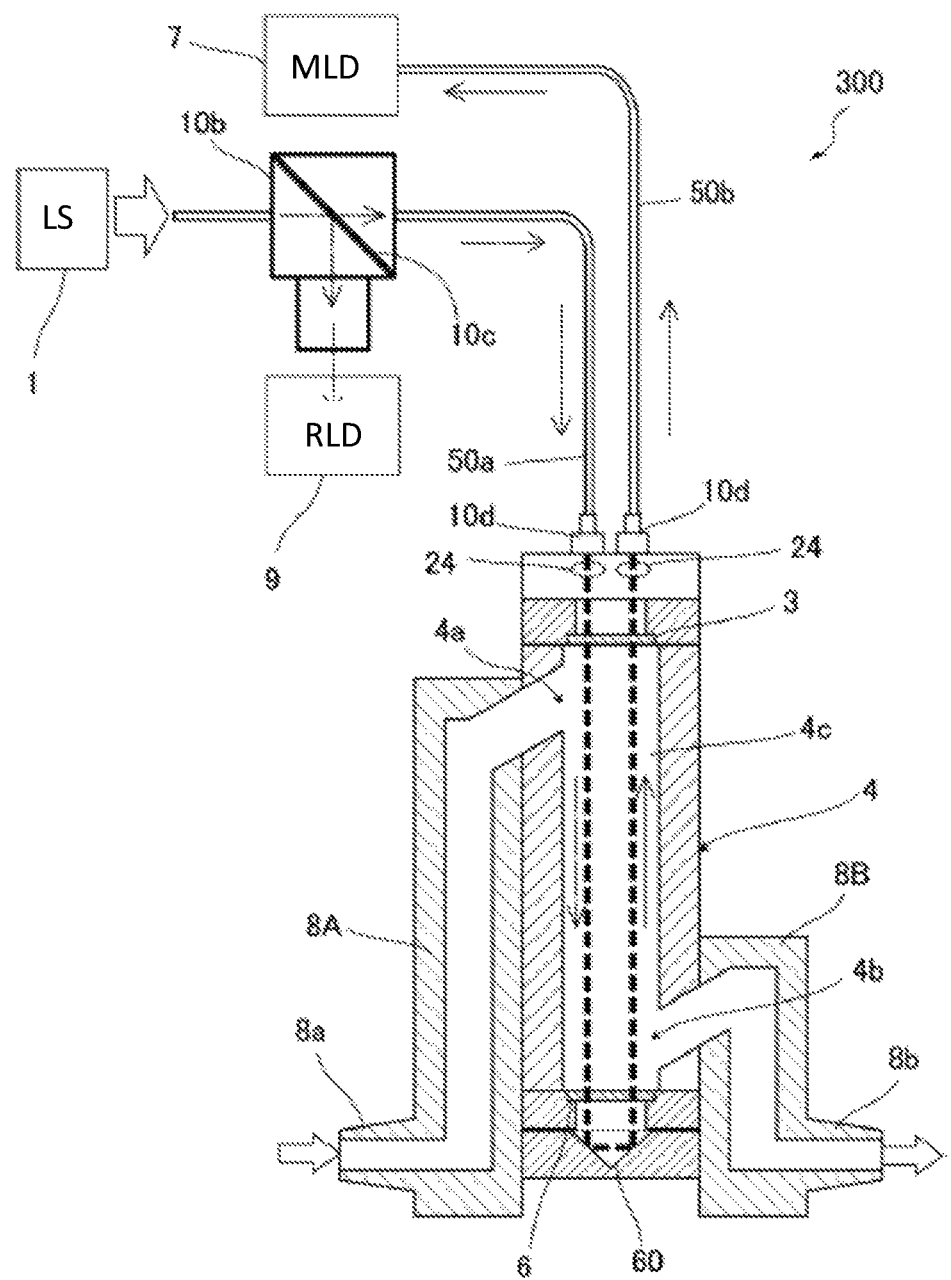
FIG. 6 is a cross-sectional view schematically illustrating the essential part of a concentration measuring device according to Embodiment 3 of the present invention.

As illustrated in FIG. 6, the measuring cell 4 of the concentration measuring device 300 also has a vertical configuration as in Embodiment 1, in which the inlet 4a and the outlet 4b that communicate with the flow passage 4c are provided one on either side of the measuring cell 4, apart from each other, and the flow passage 4c extends in the vertical direction. The inlet 4a is disposed in proximity to the window 3, and the outlet 4b is disposed in proximity to the reflective member 60. This configuration has the advantages of saving space and allowing ease of maintenance when the concentration measuring device is incorporated in a gas supply line.

The measuring cell 4 is mounted on an optical fiber 50a for light incidence and an optical fiber 50b for light reception via separate connecting parts 10d (and optical elements 24). That is, a first optical device that guides the light emitted from the light source 1 to the window 3 of the measuring cell 4 and a second optical device that guides the light exiting from the window 3 of the measuring cell 4 to the measurement light detector 7 are provided separately in the concentration measuring device 300. However, the connecting parts 10d of the optical devices are disposed at one end of the vertical measuring cell 4 (in proximity to the window 3), and therefore this configuration also achieves overall downsizing of the concentration measuring device 300.

The light exiting from the optical fiber 50a of the first optical device passes through the optical element 24 and the window 3 and travels along the flow passage 4c to the reflective member 60. At this time, the incident light travels in the same direction as the flow of gas in the measuring cell 4. Thereafter, the light is reflected by the reflective member 60 and travels toward the connecting part 10d of the second optical device (optical fiber 50b) along the other optical path that is parallel to the optical path of the incident light. At this time, the reflected light travels in the opposite direction to the flow of gas in the measuring cell 4. Note that the direction of the gas flow may be the opposite direction to that in FIG. 6 (i.e., the inlet 4a may be provided in proximity to the reflective member 5, and the outlet 4b may be provided in proximity to the window 3), and in this case, the travel direction of the incident light is the opposite direction to the direction of the gas flow, and the travel direction of the reflected light is the same direction as the direction of the gas flow.

As described above, in Embodiment 3 and other embodiments, one of the incident light and the reflected light travels in the same direction as the flow of gas in the measuring cell 4, and the other of the incident light and the reflected light travels in the opposite direction to the flow of gas. Thus, even the in-line concentration measuring device can perform stable concentration measurement unsusceptible to the influence of the gas flow.

The reflective member 60 may be configured by, for example, a trigonal prism, in which case light is reflected twice off the two reflecting surfaces of the prism, and the reflected light travels along the other optical path that is parallel to the optical path of the incident light as illustrated in FIG. 6. The prism may be fitted into a recess of a metallic holding member, or may be provided with the reflecting surfaces exposed so as to adjoin a medium with a low refractive index such as air. Also, a metal film or a dielectric multilayer film may be formed as a reflective layer on the reflecting surfaces of the prism. Moreover, although FIG. 6 illustrates a mode in which the prism serving as the reflective member 60 is provided separately from the reflection-side window 6, a reflective member configured by integrally forming the prism and the reflection-side window 6 and providing a prism structure on the rear surface side of the reflection-side window 6 may be used as the reflective member 60.

Embodiment 4

A concentration measuring device 400 according to Embodiment 4 will be described hereinafter with reference to FIG. 7. Constituent elements that are the same as those of Embodiments 1 to 3 are given the same reference numerals, and detailed description thereof is omitted.

Unlike the concentration measuring device 100 of Embodiment 1, the concentration measuring device 400 according to the present embodiment is configured using a reflective member 70 such that the incident light and the reflected light pass along different optical paths in the measuring cell 4. Also, like the concentration measuring device 300 of Embodiment 3, the concentration measuring device 400 includes a first optical device (optical fiber 50a for light incidence) that guides the light emitted from the light source 1 to the window 3 of the measuring cell 4 and a second optical device (optical fiber 50b for light reception) that guides the light exiting from the window 3 of the measuring cell 4 to the measurement light detector 7.

The measuring cell 4 of the concentration measuring device 400 also has a vertical configuration as in Embodiment 1, in which the inlet 4a and the outlet 4b that communicate with the flow passage 4c are provided one on either side of the measuring cell 4, apart from each other, and the flow passage 4c extends in the vertical direction. The inlet 4a (or the outlet 4b) is disposed in proximity to the window 3, and the outlet 4b (or the inlet 4a) is disposed in proximity to the reflective member 60.

In the concentration measuring device 400, the reflective member 70 has a reflecting surface that is disposed so as to be slightly inclined to a plane perpendicular to the travel direction of the incident light. In the present embodiment, the reflecting surface of the reflective member 70 is formed of a dielectric multilayer film (e.g., a laminated body of a thin film with a high refractive index and a thin film with a low refractive index). The angle of inclination of the reflecting surface is determined from, for example, the distance from the connecting part 10d of the first optical device to the reflecting surface and the distance between the connecting parts 10d of the optical devices.

With the use of this reflective member 70, the reflected light is guided to the second optical device along the optical path different from the optical path of the incident light and detected by the measurement light detector 7, which is separately provided, without being reflected by the beam splitter 10b as in Embodiment 1. Accordingly, higher light output can be detected.

Figure 7:
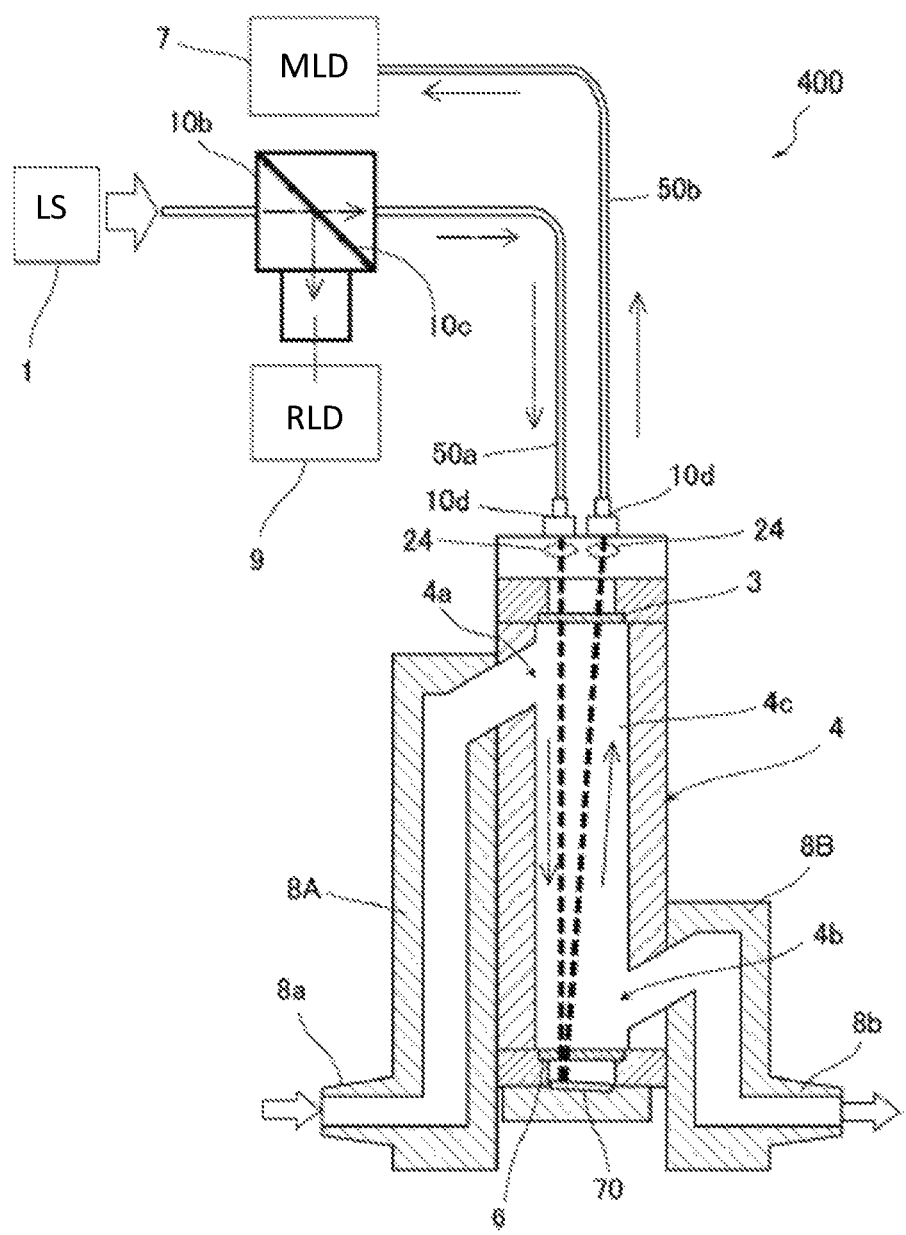
FIG. 7 is a cross-sectional view schematically illustrating the essential part of a concentration measuring device according to Embodiment 4 of the present invention.

While FIG. 7 illustrates a mode in which the travel direction of the incident light is the vertical direction in FIG. 7 and the reflecting surface of the reflective member 70 is inclined, another embodiment is also possible in which the travel direction of the incident light is an oblique direction, and the reflecting surface of the reflective member 70 is set to be horizontal. In order to make oblique the travel direction of the incident light, for example, the optical axis of the optical element 24 provided for the first optical member may be inclined slightly to the left with respect to the vertical direction, and the optical axis of the optical element 24 provided for the second optical member may be inclined slightly to the right with respect to the vertical direction.

Also, in the present embodiment, in the case where the length of the measuring cell 4 is sufficiently greater than the distance between the connecting parts 10d, the optical path length of the measuring cell 4 can be approximated at two times the distance $L_{3-6}$ between the window 3 and the reflection-side window 6, but in the case where the length of the measuring cell 4 is relatively short, the optical path length of the measuring cell 4 can be defined as the sum ($L_{3-6}+L_{3-6}/\cos\theta$) of the distance $L_{3-6}$ between the window 3 and the reflection-side window 6 and $L_{3-6}/\cos\theta$, where $\theta$ is the angle of inclination of the reflecting surface.

Embodiment 5

A concentration measuring device 500 according to Embodiment 5 will be described hereinafter with reference to FIG. 8. Constituent elements that are the same as those of Embodiments 1 to 4 are given the same reference numerals, and detailed description thereof is omitted.

As in Embodiments 3 and 4, the concentration measuring device 500 according to the present embodiment also separately includes a first optical device (optical fiber 50a for light incidence) that guides the light received from the light source 1 to the measuring cell 4 and a second optical device (optical fiber 50b for light reception) that guides the light exiting from the measuring cell 4 to the measurement light detector 7, and is configured such that the light incident on the measuring cell 4 and the reflected light pass along different optical paths.

The measuring cell 4 of the concentration measuring device 500 also has a vertical configuration in which the inlet 4a and the outlet 4b that communicate with the flow passage 4c are provided one on either side of the measuring cell 4, apart from each other, and the flow passage 4c extends in the vertical direction. The inlet 4a (or the outlet 4b) is disposed in proximity to the window 3, and the outlet 4b (or the inlet 4a) is disposed in proximity to the reflective member 5.

In the concentration measuring device 500, an optical element 54 that receives the light exiting from the first optical device and causes the light to enter the measuring cell 4 and that also receives the reflected light from the measuring cell 4 and causes the light to enter the second optical device is provided in proximity to the window 3. The optical element 54 is, for example, a lens for collimating the incident light and is shared by the first optical device and the second optical device.

In the present embodiment, an optical axis 54x of the optical element 54 is arranged between the first optical device and the second optical device. At this time, the center of a region in which the optical element 54 is irradiated with the light exiting from the first optical device is located at a position away from the center of the optical element 54 (which is on the optical axis).

In this configuration, light that has undergone refraction by the optical element 54 travels in an oblique direction inclined to the vertical direction in the measuring cell 4, and the light reflected by the reflective member 5 travels in an oblique direction along the optical path different from the optical path of the incident light. The light incident again on the optical element 54 then undergoes refraction by the optical element 54 and is collected at the second optical device.

While the concentration measuring devices according to Embodiments 1 to 5 of the present invention have been described above, the present invention is not intended to be narrowly interpreted as the embodiments described above, and various modifications are possible without departing from the scope of the present invention. For example, the light used in measurement may also be light with a wavelength range other than the ultraviolet range.

INDUSTRIAL APPLICABILITY

The concentration measuring devices according to embodiments of the present invention can be suitably used to measure the concentration of gas flowing through a flow passage when incorporated in a gas supply line for use in semiconductor manufacturing equipment or other such equipment.

REFERENCE SIGNS LIST

1 Light source
3 Window
4 Measuring cell
4a Inlet
4b Outlet
4c Flow passage
5 Reflective member
6 Reflection-side window
7 Measured light detector
8 Calculation part
8A First flow passage forming member
8B Second flow passage forming member
10 Optical device
10a Optical fiber
10b Beam splitter
10d Connecting part 24 Optical element
50a Optical fiber for light incidence (first optical device)
50b Optical fiber for light reception (second optical device)
100 Concentration measuring device

The invention claimed is:

1. A concentration measuring device comprising:
a measuring cell that includes a flow passage of a gas to be measured and a translucent window adjoining the flow passage;
a light source that emits light to enter the measuring cell through the window;
a light reflector that reflects the light propagating through the measuring cell, and causes reflected light to exit from the measuring cell through the window;
a light detector that detects light exiting from the window of the measuring cell;
a calculation part that calculates a concentration of the gas to be measured on a basis of a detection signal of the light detector; and
an optical device that guides the light emitted from the light source to the window of the measuring cell, and guides the light exiting from the window of the measuring cell to the light detector,
wherein a first side and a second side sandwiching the flow passage therebetween and opposing to each other are defined in the measuring cell,
one of an inlet of the flow passage and an outlet of the flow passage is disposed in proximity to the window on the first side while the other is disposed in proximity to the light reflector on the second side,
the gas flows through the flow passage along a direction parallel to the propagating light,
the inlet and the outlet are arranged between the window and the light reflector, and
a reflection-side window formed of a translucent plate is disposed apart from and in front of the light reflector to seal an end of the flow passage, and the light reflector includes a reflective layer disposed on the backside of the light reflector.

2. The concentration measuring device according to claim 1, wherein
the light reflector is disposed opposing the window across the flow passage.

3. The concentration measuring device according to claim 1, wherein
the optical device includes a light guide member and a beam splitter that is connected to the light guide member, and
the beam splitter receives the light from the light source and causes the received light to enter the measuring cell via the light guide member, and receives the light exiting from the measuring cell and guided by the light guide member and causes the received light to enter the light detector.

4. The concentration measuring device according to claim 1, wherein
the optical device includes an optical fiber bundle that includes an optical fiber for light exit that guides the light emitted from the light source to the window of the measuring cell, and an optical fiber for light reception that guides the light exiting from the window of the measuring cell to the light detector.

5. The concentration measuring device according to claim 1, wherein
the light is ultraviolet light, and the light reflector includes a reflective layer formed of a material containing aluminum or a reflective layer formed of a dielectric multilayer film.

6. The concentration measuring device according to claim 1, wherein
the light reflector includes a translucent plate and a reflective layer provided on one surface of the translucent plate, and has a front-back distinguishable structure for distinguishing a surface on which the reflective layer is provided from the other surface of the translucent plate.

7. The concentration measuring device according to claim 6, wherein
the front-back distinguishable structure is configured by asymmetrically disposing any of a flat face provided on a side face of the translucent plate, a recess or a through hole provided in the translucent plate, and a protrusion provided on the translucent plate.

8. The concentration measuring device according to claim 1, wherein the light is ultraviolet light.

9. The concentration measuring device according to claim 1, wherein the reflection-side window is formed of a sapphire glass plate and the light reflector is formed of a sapphire glass plate having an aluminum layer as the reflection layer on its backside formed by sputtering.

10. A concentration measuring device comprising:
a measuring cell that includes a flow passage of a gas to be measured and a translucent window adjoining the flow passage;
a light source that emits light to enter the measuring cell through the window;
a light reflector that reflects the light propagating through the measuring cell, and causes the reflected light to exit from the measuring cell through the window;
a light detector that detects the light exiting from the window of the measuring cell;
a calculation part that calculates a concentration of the gas to be measured on a basis of a detection signal of the light detector; and
a first optical device that guides the light emitted from the light source to the window of the measuring cell, and a second optical device that guides the light exiting from the window of the measuring cell to the light detector,
wherein the light reflector is configured to receive incident light that has been incident from the first optical device and has propagated through the flow passage of the measuring cell, and reflect the light as reflected light to the second optical device along an optical path different from the optical path of the incident light,
a first side and a second side sandwiching the flow passage therebetween and opposing to each other are defined in the measuring cell,
one of an inlet and an outlet of the flow passage is disposed in proximity to the window on the first side, and the other is disposed in proximity to the light reflector on the second side,
the gas flows through the flow passage along a direction parallel to the propagating light,
the inlet and the outlet are arranged between the window and the light reflector, and
a reflection-side window formed of a transparent plate is disposed apart from and in front of the light reflector to seal an end of the flow passage, and the light reflector includes a reflective layer disposed on the backside of the light reflector.

11. The concentration measuring device according to claim 10, wherein
the light from the light source is caused to branch off and enter a reference light detector as reference light.

12. The concentration measuring device according to claim 10, wherein
the optical path of the reflected light is parallel to the optical path of the incident light.

13. The concentration measuring device according to claim 12, wherein
the light reflector includes a trigonal prism.

14. The concentration measuring device according to claim 10, wherein
the light reflector includes a reflecting surface that is inclined to a plane perpendicular to a travel direction of the incident light.

15. The concentration measuring device according to claim 10, further comprising:

an optical element that is provided in proximity to the window, receives the light exiting from the first optical device and causes the light to enter the measuring cell, and receives the reflected light from the measuring cell and causes the light to enter the second optical device, wherein an optical axis of the optical element is disposed between the first optical device and the second optical device.

16. The concentration measuring device according to claim 10, wherein the light is ultraviolet light.

17. The concentration measuring device according to claim 10, wherein the reflection-side window is formed of a sapphire glass plate and the light reflector is formed of a sapphire glass plate having an aluminum layer as the reflection layer on its backside formed by sputtering.

* * * * *